３,476,508
CATALYTIC PURIFICATION TREATMENT OF EXHAUST GAS
Kenneth K. Kearby and Robert J. Lang, Watchung, N.J., assignors to Esso Research and Engineering Company, a corporation of Delaware
No Drawing. Filed Oct. 27, 1965, Ser. No. 505,413
Int. Cl. B01d 47/00
U.S. Cl. 23—2                5 Claims

ABSTRACT OF THE DISCLOSURE

Exhaust gases are contacted with a zeolite catalyst, e.g., zinc-exchanged faujasite, to decompose the unburned hydrocarbons contained therein. The exhaust gases are further contacted with a shift catalyst to reduce the nitrogen oxide and carbon monoxide components of the gas.

---

This invention relates to a catalytic treatment of exhaust gases from internal combustion engines for removal of air pollutants, such as unburned hydrocarbons, carbon monoxide and nitrogen oxides from the exhaust gases. It is concerned more particularly with a catalytic system for such a treatment that uses catalysts resistant to usual catalyst poisons present in exhaust gases, e.g., lead, sulfur, halogens, and other such metals or metalloids as elements or in compounds, and that uses catalysts which have high-activity maintenance with only small amounts of elemental oxygen normally present in the gases treated.

More particularly, the present invention involves a treatment of exhaust gases with a crystalline zeolite catalyst which functions to effect a destructive decomposition of hydrocarbon components primarily by splitting off hydrogen rather than by oxidation so that the hydrocarbon components are not converted to other pollutants such as oragnic acids, peroxides, aldehydes, ketones, etc., and the thus treated exhaust gases continue to contain CO.

Many of the methods proposed in the past for purification treatments of exhaust gases have involved after-burning or oxidation with air, using oxidation catalysts that may include oxygen carriers. These oxidation treatments generally are nonselective and depend upon having enough reactive oxygen present to oxidize CO to $CO_2$ and to oxidize the hydrocarbons in the exhaust gases.

There are difficulties in making the oxidation treatments selective to oxidize only hydrocarbons in order to have the catalyst operate at lower temperatures with longer life. Such a selective oxidation gives less trouble in removing heat from the catalyst, and in supplying excess oxygen, and it gives a lower gas flow rate with a lower back pressure, as well as permitting the use of cheaper containers. Obstacles to controlling oxidation treatments are the variations of the compositions of the exhaust gases, their temperatures, and their flow rates with speed, load, engine temperatures, air/fuel ratios, etc.

The present invention provides a catalytic treatment of exhaust gases using specific crystalline zeolite type catalysts now found to have excellent properties for selective removal of hydrocarbon from exhaust gases without the difficulties that arise in the known oxidation treatments. The zeolite catalysts suitable for selective removal of the hydrocarbons are resistant to the usual catalyst poisons mentioned. They do not require a closely controlled addition of air or oxygen to perform their function of effecting a destructive decomposition of the hydrocarbons through a wide range of variations in the composition, temperature, and flow rate of the exhaust gases.

The zeolite catalyst treatment for removal of hydrocarbon components from an exhaust gas without much effect on the CO and NO component can be used advantageously in conjunction with another catalytic treatment, especially with a water-gas shift catalyst which removes CO or a catalyst which removes both CO and nitrogen oxides.

The catalytic treatment of exhaust gas for selective removal of hydrocarbon components conjointly with a treatment by a different catalyst to remove the carbon monoxide or CO and NO is simplified if the different catalysts promoting these different reactions are not sensitive to the usual poisons, and if the conditions of operation in one treatment do not interfere with the operation of the other treatment. Thus, a single catalytic container may be used to hold the different catalysts. The different catalysts may be mixed or in a sequence of layers or beds through which the exhaust gases pass. The different catalysts may be held in separate containers, also. Preferably, at least for determining the effects of the different catalysts and controlling the extent of each reaction, the catalyst for selective decomposition of the hydrocarbon components is first contacted by the exhaust gases, then the thus treated exhaust gases are contacted with the catalyst which removes CO or CO and NO.

The herein set forth mechanism of the treatment with certain crystalline zeolite catalysts involving a destructive decomposition of the hydrocarbons by breaking of C—H bonds thereby forming coke and carbon is based upon experimental observation but is not to be considered as limiting the scope of the invention. Elemental oxygen in the low amount normally present in exhaust gas reacts with the coke or carbon thus being formed.

The catalysts useful in performing the destructive decomposition of hydrocarbon components of exhaust gases are crystalline zeolites, the term zeolite being applied to hydrated alumino-silicates that contain easily exchangeable ions such as sodium or potassium. Crystalline alumino-silicates of the molecular sieve or zeolite type may contain from 1.25 to 3 Si atoms per Al atom, have pore sizes from 4 to 15 A. in diameters and have the alkali metal Na or K, replaced by other cations. The most suitable zeolite for the purposes of the present invention are of the faujasite type with a Si:Al atom ratio of 1.5 to 3.0, usually 2.5 to 3, and with pore diameters in the range of 9 to 15 A., and having the alkali metals partially replaced by divalent cations and protons.

A zinc-exchanged faujasite type zeolite has been found to have excellent properties for removing hydrocarbon pollutants from exhaust gas. This catalyst may be used effectively at temperatures of 500 to 1500° F., and at throughputs of 10 to 50,000 v./v./hr. of exhaust gas from gasoline of the conventional type. An outstanding advantage for it is that it is less sensitive to poisoning by sulfur, lead, halogens, phosphorus, boron, etc. than are other catalysts, for example nickel or platinum.

The faujasite may be partially or completely exchanged with zinc. Preferred compositions contain about 5 to 12 percent of zinc. While a zinc-exchanged faujasite is preferred, good activity can also be obtained by using faujasites exchanged with $H^+$, $NH_4^+$, $Ca^{++}$, $Mg^{++}$, $Cd^{++}$, $Cu^{++}$, $Fe^{++}$, $Ni^{++}$, $Mn^{++}$, $Pt^{++}$, or $Pd^{++}$, or with combinations of these ions. It will be understood that the term faujasite as used in this memorandum, refers to either natural minerals or to synthetic preparations. Such synthetic preparations may contain minor amounts of impurities such as Fe, Ni, etc. and these can have a beneficial effect. A synthetic faujasite preferred for this catalyst is sometimes designated as "13Y" type molecular sieve. However, we have found that zinc exchanged zeolites of the 13X, 5A, mordenite and erionite types also have some activity for purifying exhaust gas. It is also possible to use amorphous zeolites or silica-alumina acid type catalysts as a support for zinc for purifying exhaust gas, but these are less active than zinc faujasite.

When using exchanged molecular sieve type catalysts, binders such as silica, alumina, silica-alumina, clays, etc. may be used to improve physical strength.

The zinc in a faujasite type catalyst does not have high activity for removing CO or NO from exhaust gas, and is improved by combining it with well-known water gas shift catalysts. These usually consist of iron oxide primarily, along with some $Cr_2O_3$, and may also contain Mn, and alkali or alkaline earth oxides. However, compositions containing Ni, Pt, Pd, Co, etc. may also be used. Also, a CuO—ZnO±$Cr_2O_3$ Girdler low temperature shift catalyst may be used in conjunction with the hydrocarbon conversion catalysts discussed above. The shift type catalyst may precede or follow or be mixed with the zeolite catalyst.

In addition, one may use these combinations as catalysts and have them serve as a guard for a following bed of nickel or platinum catalyst which will clean up any unconverted reactants. Alternatively one may put both zinc and Ni, Pt, Fe, etc. on the zeolite by base exchange. Faujasites containing Ca+H, or Mg+H instead of Zn+H are also excellent catalysts.

A suitable catalyst was made as follows:

EXAMPLE 1

1650 g. of sodium faujasite (31% $H_2O$) was stirred 2 hours with a solution of 380 cc. of conc. HCl and 165 cc. (28% $NH_3$) $NH_4OH$ diluted to six liter volume. The solids were filtered and washed with 3 l. distilled water. This treating procedure was repeated once, and then two more times with decantation rather than filtering. It was then given a final exchange treatment with $NH_4Cl$ and was filtered and washed twice with 2.5 l. distilled water.

One fifth of the wet cake was stirred one hour with a solution of 50 g. Zn $(NO_3)_2 \cdot 6H_2O$ in 500 cc. $H_2O$, and was filtered and washed. This treatment was repeated twice. The washed product was dried at 250° F., 320° F., and calcined 3 hours at 800° F. It consisted of some soft granules and some powder.

The zinc-faujasite catalyst prepared as described above was tested for activity to convert hydrocarbons CO, NO, and also for its resistance to poisons normally in exhaust gas—namely sulfur, halogens, and lead. The tests were carried out both with a synthetic, exhaust gas blend and with a simulated engine exhaust gas produced by a burner.

The results obtained with the synthetic exhaust gas are shown in Table I. The synthetic exhaust contained 1.4% $H_2$, 11.0% $CO_2$, 0.75% $O_2$, 3.4% CO, 11.2% $H_2O$, 0.08% isobutane, 0.09% butene-2, and 0.15% NO (mol percent).

TABLE I

| | Percent conversions | | |
|---|---|---|---|
| | 1,110° F. | 1,200° F. | 1,110° F. after S[1] |
| Butene-2 | 93 | 93 | 93 |
| iso-Butane | 69 | 67 | 77 |
| CO | 0 | 11 | |
| NO | 19 | 21 | 8 |

[1] Sulfur was added as $SO_2$ (0.25 gms. of S). The bed contained 50 cc. (27.8 gms) of catalyst and the gas rate was 10,00 v./v./hr. (STP).

These data show the high hydrocarbon conversions and the sulfur resistance of the catalyst. The relatively low activity for CO and NO are also shown.

Using the simulated exhaust gas produced by a burner fed with isooctane, even better hydrocarbon conversions were obtained at lower temperature. These are shown in Table II. A typical exhaust from the burner contains 0.07 to 0.08 mole percent hydrocarbons (calculated as hexane), 10.4% $CO_2$, 0.5% $O_2$, 3% CO, 1.5% $H_2$ and 10 to 12% $H_2O$.

TABLE II

| | Percent conversion at 900° F., 10,000 v./v./hr. | | |
|---|---|---|---|
| | $C_4$ | Isooctane | CO |
| After 50 hrs. on isooctane | 88 | 89 | |
| After 120 hrs. on 120 p.p.m. S | 82 | 73 | |
| After a brief exposure 1.5% $O_2$ | 81 | 86 | Approx. 3 to 6% make. |
| After 20 hrs. on halogens [1] | 82 | 83 | |
| After 70 hrs. on Pb [2], 260 hrs. total | 73 | 75 | |

[1] Cl to Br, 2 moles to one, .8 theory based on 3 cc. TEL (tetraethyl lead) per gal.
[2] 3 cc. TEL per gal. Also includes 120 p.p.m. S and 1.5 theory of halogen scavengers (2:1 mole ratio ethylene dichloride to ethylene dibromide).

These data show that high hydrocarbon conversions were obtained initially and these decreased only slightly when poisons were fed both individually or in combination. For comparison a nickel catalyst deactivated at a rate of about 5% conversion per hour, when only the 120 p.p.m. of S was added.

These data also illustrate that the catalyst is regenerable by exposure to oxygen. The addition of air however, does not cause destructive temperature increases in the bed through the oxidation of CO. Even with an extra 1% $O_2$ added to the burner gas there was a slight increase in CO after passage through the catalyst and no perceptible temperature rise.

An important advantage of this catalyst is that it decomposes the hydrocarbons in the exhaust without adding air. In this process it is recognized that the hydrocarbons can react with $H_2O$, with $CO_2$ and the small amounts of $O_2$ normally present in exhaust gases.

A number of other molecular sieve catalysts were tested and were found to give results sufficiently good to make them of interest for the purposes of this invention.

EXAMPLE 2

A silver-exchanged faujasite showed an initial activity almost as high as that of Zn exchanged faujasite for decomposing hydrocarbons without substantial conversion of CO but was found to need more care in regeneration by air when carbonized to avoid damage to the catalyst by heating to high temperatures.

EXAMPLE 3

Copper and nickel exchanged molecular sieves were both active for destructive decomposition of $C_1$ to $C_8$ hydrocarbons in exhaust gases. The Cu-molecular sieve was less active than the Zn-exchanged molecular sieve for decomposing $C_8$ hydrocarbons. The Ni-exchanged zeolite catalyst converted CO and NO in the exhaust gases under reducing conditions.

EXAMPLE 4

A straight acid ($NH_4^+$ exchanged) faujasite gave good decomposition of hydrocarbons.

EXAMPLE 5

Equal volumes of Zn-faujasite and a commercial water gas shift catalyst ($Fe_2O_3$+8% $Cr_2O_3$) were mixed and pelleted. The test runs with this catalyst showed fairly good destructive decomposition of hydrocarbons and about 60% conversion of CO and 95% nitric oxide conversion.

EXAMPLE 6

A dual bed of the Zn-faujasite and the shift catalyst of the type used in Example 5 was used for treatment of exhaust gas, the shift catalyst bed being downstream. Initial activity for decomposition of hydrocarbon in the first bed and good conversion (50 to 60%) of CO was obtained in the second bed. Even with 120 p.p.m. sulfur as $SO_2$ added to the exhaust gas treated, the activity remained high.

In another similar test with a dual bed the following results were obtained with simulated exhaust from a burner:

TABLE III

| | Percent conversion at 900° F. | | | |
|---|---|---|---|---|
| | $C_4$ | Isooctane | CO | NO |
| After 44 hrs. on Isooctane | 90 | 77 | 64 | 96 |
| After 116 hrs. on Pb [1] | 80 | 71 | 41 | 95 |

[1] 3 cc. TEL per gal. Also includes 120 p.p.m. S and 1.5 theory of hologen scavengers (2:1 Cl:Br mole ratio) and 0.2 theory of phosphorous.

EXAMPLE 7

In the treatment of exhaust gases with calcined $NH_4$-faujasite the decomposition of hydrocarbons was almost as high as with Zn-faujasite, with no substantial conversion of CO and with about 24% conversion of NO. The $NH_4$-exchanged faujasite was found fairly resistant to S posioning. This catalyst is an acid type crystalline zeolite catalyst and the results indicate the importance of the C—H bond splitting function.

EXAMPLE 8

A catalyst was prepared from a synthetic faujasite by replacing Na with Zn so that the catalyst contained 6.1 wt. percent Zn and 1.4 wt. percent Na. This catalyst was tested in a dual bed combination with a commercial watergas shift catalyst containing Cu Cr, and Zn. The exhaust gases were made to flow through the Zn faujasite at 10,000 v./v./hr. then through the shift catalyst bed at 16,000 v./v./hr. This combination gave a 41% conversion of $C_1+C_2$ hydrocarbons, 96 to 100% conversion of $C_3$ to $C_8$ hydrocarbons, and 61% conversion of CO. Nitrogen oxides were converted when the gases contacting the shift catalyst had reducing action.

EXAMPLE 9

Tests were conducted with a dual bed system of Zn-exchanged faujasite catalyst bed, followed by an Fe-containing shift catalyst bed on exhaust gas from stock automobiles and the results were well in line with tests that used simulated exhaust gases, e.g. 39 to 48% $C_1+C_2$ hydrocarbon conversions, 63 to 98% $C_3$ to $C_8$ hydrocarbon conversions, 55 to 79% CO conversion, and a fairly good conversion of nitric oxide, which improves with increased reducing action of the gas.

The tests on treatment of exhaust gases from automobile engines were made under cyclic driving conditions (idling and acceleration to 50 m.p.h.) and to meet standards of not decreasing the brake H.P. at 3000 r.p.m. by more than 5% by resistance to the flow of exhaust gas through the catalyst beds in the treating device.

EXAMPLE 10

A magnesium-exchanged faujasite catalyst also gave good hydrocarbon conversions. Using simulated exhaust gas from a burner the following results were obtained:

TABLE IV

| | Percent conversion at 900° F., 10,000 v./v./hr. | | |
|---|---|---|---|
| | $C_4$ | Isooctane | CO |
| After 70 hrs. on Isooctane | 92 | 95 | 0 |
| After 140 hrs. on Pb [1] | 87 | 86 | 0 |

[1] 3 cc. TEL per gal. Also includes 120 p.p.m. S and 1.5 theory of halogen scavengers (2:1 mole ratio ethylene dichloride to ethylene dibromide), and 0.2 theory of phosphorous.

EXAMPLE 11

A calcium-faujasite catalyst also performed well on simulated exhaust gas from a burner:

TABLE V

| | Percent conversion at 900° F., 10,000 v./v./hr. | | |
|---|---|---|---|
| | $C_4$ | Isooctane | CO |
| After 118 hrs. on Isooctane | 76 | 76 | 0 |
| After 46 hrs. on Pb [1] | 59 | 51 | 0 |

[1] 3 cc. TEL per gal. Also includes 120 p.p.m. S and 1.5 theory of halogen scavengers (2:1 mole ratio ethylene dichloride to ethylene dibromide), and 0.2 theory of phosphorous.

In the foregoing Examples 10 and 11 the nitrogen oxide conversions with a single bed of the exchanged faujasite catalyst are not substantial. This shows the need for using an additional shift catalyst, preferably a hydrogenating shift catalyst to obtain nitrogen oxide conversions in the faujasite treated exhaust gases.

The following general observations were made in test studies on the use of the zeolite type and shift catalysts:

(a) The system of a zeolite catalyst and shift catalyst can be used practically in an automotive muffler which holds pellets or granules of the catalysts in the path of flow of the exhaust gases.

(b) Such catalysts are sufficiently resistant to normal catalyst poisons or deterioration by other causes to give desired conversions of pollutants for more than 300 hours.

(c) Oxygen normally present in exhaust gases is the significant oxidant for removal of carbon and coke from the sieve catalyst.

(d) The best synergistic and cooperative effect is obtained from a dual system of a hydrocarbon decomposing catalyst and a hydrogenating type catalyst when the hydrocarbons first undergo decomposition to make the resulting exhaust gas environment of the nitrogen oxides a reducing atmosphere which then comes into contact with the hydrogenating type catalyst, such as contains iron, Ni, Cu, Cr, or Zn as reduced metals, as oxides, and as present in shift catalysts.

(e) Excessive amounts of $O_2$ present or added to the exhaust gases, e.g. more than 1.1%, have an adverse effect on the function of the shift catalyst for converting nitrogen oxides. The $O_2$ in such excessive amounts does not make any substantial improvement in removal of the hydrocarbon or organic components.

(f) With just enough $O_2$ present in the exhaust gases for maintaining activity of the catalysts formation of $CO_2$ from the CO is negligible in the zeolite catalyst bed and there is no appreciable formation of oxygenated hydrocarbons based on odor or water condensate removed from the treated exhaust gases.

The catalyst system may be enclosed in any suitable container, such as a muffler designed to be attached to an exhaust pipe that removes exhaust gases from engines, or such as a cartridge designed to be placed in a muffler.

The hydrogenating shift catalysts may be mixed or be preceded by solids which adsorb sulfur compounds, as for example pellets or granules containing calcium-sodium-silicates that contain 82 to 60 wt. percent Ca, as CaO, 10 to 20 wt. percent Na as $Na_2O$, and 8 to 20 wt. percent $SiO_2$, such adsorbent materials may be used to more advantage when fuels burned evolve relatively large amounts of $SO_2$.

Still other modifications with the spirit of this invention may be made.

The invention described is claimed as follows:

1. The method of treating exhaust gases which comprises contacting said gases at a temperature within the range between about 500° and about 1500° F. with a crystalline zeolite first catalyst to decompose hydrocarbon components without added oxygen and thus obtaining treated exhaust gases having most of their hydrocarbon components eliminated and continuing to contain CO, wherein the treated exhaust gases are further treated by contact with a second catalyst that promotes reaction of CO component with $H_2O$ component of the exhaust gas to convert the CO to $CO_2$ before the thus further treated exhaust gases are released to the atmosphere.

2. The method of treating as set forth in claim 1, wherein said second catalyst is a shift catalyst containing a hydrogenating metal that promotes reduction of NO and conversion of CO to $CO_2$.

3. The method of treating exhaust gases as set forth in claim 1, wherein said second catalyst is a hydrogenating shift catalyst containing Ni, Cu, Cr, or Zn as reduced metals or as oxides.

4. The method of treating exhaust gases as set forth in claim 1, wherein the zeolite catalyst is a faujasite zeolite that contains 5 to 12 percent zinc by ion exchange and the second catalyst contains iron, the zeolite and second catalysts being resistant to poisoning by substances containing S, Pb, halogens, and phosphorous.

5. The method of treating exhaust gases as set forth in claim 1, wherein the zeolite is an acidic faujasite in which alkali metal is at least partially replaced by ions of the group consisting of zinc, hydrogen, ammonia, silver, copper, calcium, magnesium, manganese and iron.

References Cited

UNITED STATES PATENTS

| | | | |
|---|---|---|---|
| 2,912,300 | 11/1959 | Cannon et al. | 23—2 |
| 3,025,133 | 3/1962 | Robinson et al. | 23—2 |
| 3,053,612 | 9/1962 | DeRosset | 23—2 |
| 3,177,152 | 4/1965 | Kearby | 23—2 X |
| 3,181,928 | 5/1965 | Frilette et al. | 23—2 |
| 3,316,057 | 4/1967 | Howk et al. | 23—2 |
| 3,346,328 | 10/1967 | Sergeys et al. | 23—2 |

OSCAR R. VERTIZ, Primary Examiner

E. C. THOMAS, Assistant Examiner

U.S. Cl. X.R.

252—455